May 17, 1938.    R. L. WELLS    2,117,385
OPHTHALMIC MOUNTING
Filed Feb. 18, 1937    2 Sheets-Sheet 1
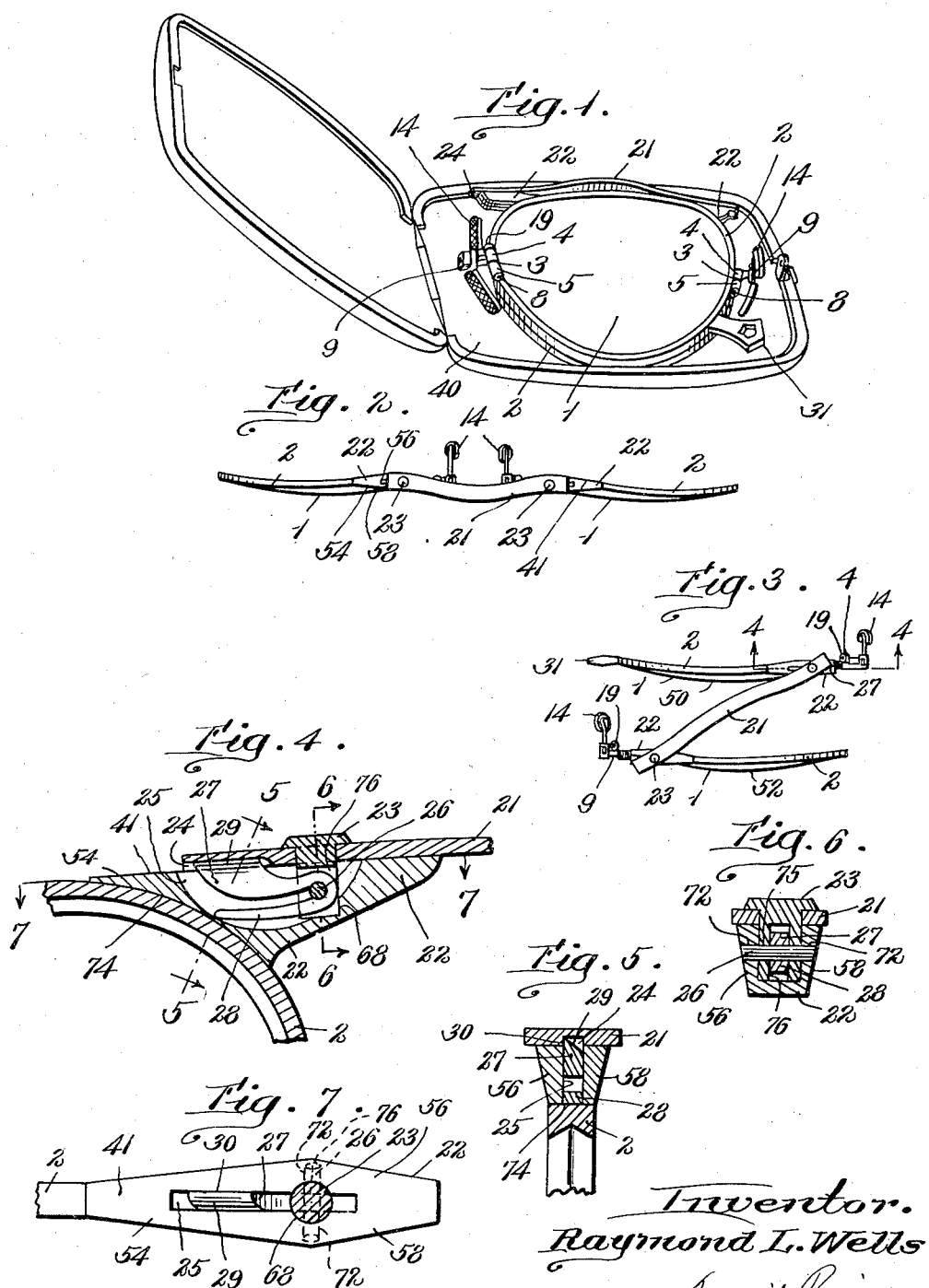
Inventor.
Raymond L. Wells
by David Rines
Atty.

May 17, 1938.  R. L. WELLS  2,117,385
OPHTHALMIC MOUNTING
Filed Feb. 18, 1937  2 Sheets-Sheet 2
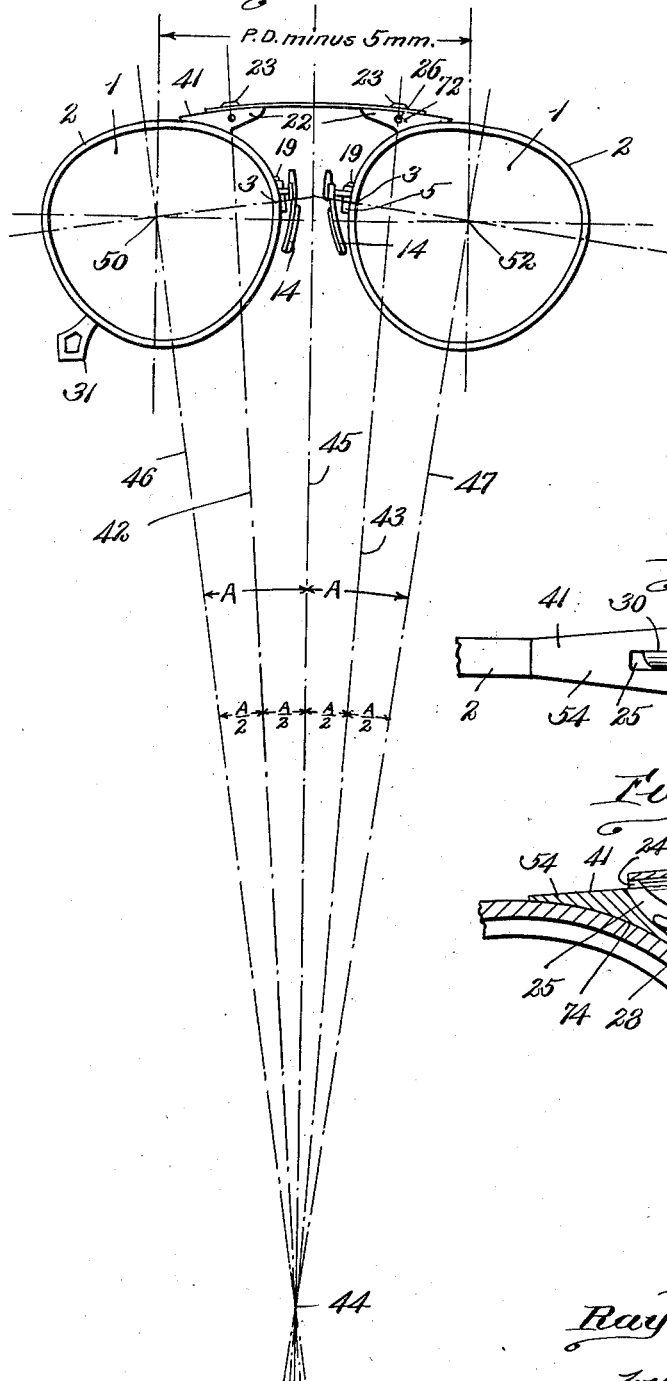
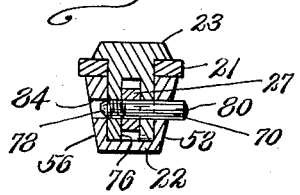
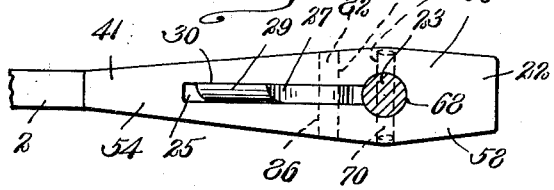
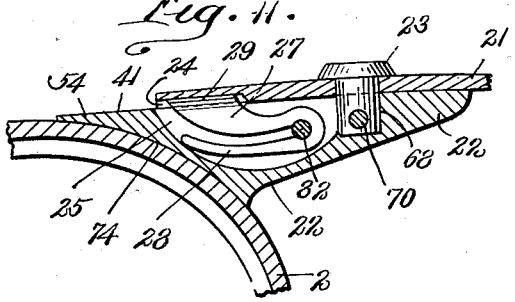
Inventor.
Raymond L. Wells
by David Rines
Atty.

Patented May 17, 1938

2,117,385

UNITED STATES PATENT OFFICE 2,117,385

OPHTHALMIC MOUNTING

Raymond L. Wells, Attleboro, Mass.

Application February 18, 1937, Serial No. 126,449

18 Claims. (Cl. 88—44)

The present invention relates to ophthalmic mountings, and though certain features thereof are of more general application, the invention is particularly related to folding oxfords, particularly of the Z-fold type disclosed in applications, Serial Nos. 711,516 and 31,187, filed, respectively, on February 16, 1934, and July 13, 1935.

In folding oxfords of the above-described character, each lens-holding rim is provided at its upper portion with a bridge-connecting abutment carrying a pivot post about which the end of a bridge is pivoted. Keepers or lock members, one provided in a slot of each abutment, hold the lenses and the bridge in alined relation. By reason of this construction, the bridge is not subjected to stress of any kind, except when the oxford is mounted on the face, and the degree of stress exerted even then is very small. Though the oxford is very simple in construction and highly efficient in use, however, it is subject to the drawback that the bridge is not removable. When either the bridge or one of the rims becomes broken, therefore, it is necessary either to discard the oxford, or to send it to the factory for repairs; and the latter alternative may involve annoyance, expense and loss of time, particularly where the factory is far away.

An object of the present invention, accordingly, is to provide an oxford of the above-described character the bridge of which shall be separable from the rims. The local optician is thus enabled readily to replace any broken part.

Other objects of the invention will appear from the following description, taken in connection with the accompanying drawings, and will be pointed out in the appended claims.

The invention will now be explained in connection with the accompanying drawings, in which Fig. 1 is a perspective view showing an ophthalmic mounting embodying the invention in its preferred form, folded in place in a small receptacle; Fig. 2 is a top view showing an ophthalmic mounting embodying the invention in open or usual position, with the parts extended for use; Fig. 3 is a top view showing the parts, partially folded, the two lenses being nearly alined and parallel with each other; Fig. 4 is an enlarged longitudinal section through a portion of the bridge and a lens rim showing the pivotal connection of the bridge and the lock for the same, the section being taken upon the line 4—4 of Fig. 3, looking in the direction of the arrows, except that the bridge is shown in alinement with the lens; Fig. 5 is a cross section showing the lock of the bridge connection, the section being taken on the line 5—5 of Fig. 4, looking in the direction of the arrows; Figs. 6 and 7 are sections taken, respectively, upon the lines 6—6 and 7—7 of Fig. 4, looking in the directions of the arrows; Fig. 8 is a front elevation, with the parts of the oxford in the "at-rest" position, corresponding to the top view of Fig. 2, in a setting of explanatory lines, as an aid to an understanding of the pivotal arrangement of the bridge and the lenses; and Figs. 9, 10, and 11 are sections corresponding, respectively, to Figs. 6, 7, and 4 illustrating a modification.

As in the said applications, the invention is illustrated in connection with lenses 1 mounted in lens rims 2, split or divided at 3, and provided with cooperating hollow elements 4 and 5, the former having a smooth bore and the latter being shown provided with a screw opening 8. A screw 19 may be loosely mounted in the element 4 and threaded in the opening 8 to hold each split rim 2 closed. The invention is not, however, restricted to use with rims 2 of the illustrated type, as other lens-holding means may be employed, including lens clamps of the rimless type; and even where rims are employed, the position of the point 3 of the split-rim connection may be varied.

The rims are each shown provided with a guard-supporting plate 9, carrying a nose guard or pad 14 of any desired type. The lenses are connected and held separated by a bridge member 21. The bridge is preferably constituted of continuous, flat, stiff, but resilient, sheet-spring material, the sheet being sufficiently thin to permit the bridge to be flexed in the vertical plane out of the plane of the sheet, because of its thinness, but sufficiently wide to resist flexing in the horizontal plane, or the plane of the sheet, because of its width. A handle-and-ribbon connection 31 may be provided.

Each lens-holding member is provided at its upper portion with a bridge-connecting abutment 22 substantially prismatic in shape, with a longitudinal cross section substantially in the form of an inverted scalene triangle. The abutments 22 are provided with substantially flat, upper surfaces 41 constituting the bases of the triangles, substantially tangentially disposed to their respective rims, or to their respective lenses, in the case of rimless oxfords. Each abutment 22 is secured to its lens-holding rim along a face 74 of the prism corresponding to one of the sides of the scalene triangle. The abutments 22 extend toward each other, beyond the edges of the lens rims, and the surface 41 of each abutment 22 is inclined slightly upward toward the opposite abutment 22. The bridge member 21 extends between the supporting abutments 22, the flat ends of the bridge being disposed in face-to-face contact with the substantially flat surfaces 41. The bridge is substantially straight at and near its ends, so that it extends from each of its ends toward its center without substantial bending, as a substantially straight continuation of the substantially tangentially disposed surfaces 41 of the abutments 22, with the lenses held below the bridge. The bridge is, however, in its normal position, very slightly bent upward, or convexed, as shown in Fig. 8. By reason of this construction, the bridge is of as short a span as practicable without making it absolutely straight; and its flexing is readily controlled, because it is not practically feasible to move the lenses away from each other more than the exact pupillary distance for which the oxford is designed. This makes it readily possible accurately to true to any desired standard, such as five millimeters.

As an illustration, the horizontal distance from center 50 to center 52 of the lenses, that is, the pupillary distance, may be 62 millimeters when the glasses are "at rest" as in Fig. 8. When the glasses are "on face" (not shown, but illustrated in Fig. 8 of the said application, Serial No. 31,187), on the other hand, the said distance will be 5 millimeters more, or 67 millimeters.

The horizontal distance between the centers 50 and 52 is therefore marked, in Fig. 8, "P. D. minus 5 mm.", indicating that it is less, by five millimeters, than the P. D. or pupillary distance. This five-millimeter truing permits sufficient grip on the nose without excessive pressure thereon. Adjustment of the guards offers opportunity to fit various facial differences from normal with this same, five-millimeter truing.

Accurate pupillary distances and, consequently, accurate fitting, is thus readily provided for. This construction further renders it possible to locate the lenses with relation to each other and to the bridge through the medium of the locking joints. After the optician has adjusted suitable guards to the nose of the wearer, the bridge will fit exactly right, and the lenses will assume the right position before the eyes, with the centers of the lenses in front of the pupils and with the bridge substantially exactly straightened out, using exactly the right degree of tension required to hold the glasses on the face.

The bridge 21 is of such length that it shall lie in substantially a straight line when the oxford is mounted upon the face, in its "on-face" position, thus absolutely fixing the pupillary distance between the centers 50 and 52 of the lenses.

Adjacent its ends, the bridge 21 is provided with pivot-post connections 23, which may be in the form of posts or pins pivotally connecting the bridge to the abutments 22, which latter thus constitute pivot supports. The pivot posts or pins 23 may be constituted of removable or detachable dowels disposed transversely to the respective abutments 22, in bores 68, so that the pivot posts 23 shall be substantially at right angles to the flat surfaces 41. The bridge is maintained against the abutments 22 by the heads of the pivot dowels 23 engaging the respective ends of the bridge. The upper portions of the dowels 23 provide a smooth bearing surface for the bridge. The underside of the bridge is channeled or recessed at each end, as shown at 24. Each abutment 22 is longitudinally recessed or slotted at 25, in a plane substantially parallel to, and midway between, the scalene-triangular faces of the prismatic abutment. The slot 25 may be formed by means of a circular saw, so as to be in alined relation to the recess 24 when the mounting occupies the position illustrated in Figs. 2 and 8. The abutment 22 is thus constituted of a body portion 54 having the surface 41, and two side portions 56 and 58 separated by the slot 25. Both the bore 68 and the slot 25 extend into the abutment from the face 41 corresponding to the inverted base of the said scalene triangle. The bore 68 is disposed intermediately of, and is wider than, the recess 25, so that the pivot member 23 may be positioned in substantially the plane of its lens or substantially parallel thereto.

A keeper or lock member 27 is pivoted within the slot 25 of the abutment 22 around a pivot post 26 that extends through openings 72 in the side portions 56 and 58. The openings 72 extend through the abutment 22 between its scalene-triangular faces and through the bore 68. Each keeper 27 has a beveled or cam-face end 29 projecting through the openings or recesses 24 and 25, when these recesses are alined, as shown in Figs. 4 and 5, provided on one side with a bevel or cam face 29 and on the other with a solid shoulder 30.

The keeper or lock 27 is made in one piece, or integral, with a blade spring 28, having its free end bottoming at the base of the slot 25. The spring 28 thus resiliently causes the keeper or lock 27 to extend through the slot 25 into the recess 24.

This beveled face 29 acts as a cam surface to operate the keeper when the bridge 21 is rotated about its pivot 23, thus to permit folding of the oxford in one direction only. When the bridge portion 21 is moved towards the left, about the pivot 23, as viewed in Fig. 5, the right-hand wall of the opening 24 will push against the bevel or cam face 29 of the keeper, and push it downward out of the way. Relative pivotal movement of the bridge 21 and the lens-holding members about the pivots 23, in the opposite direction, towards the right, however, is limited, after the lens members have been moved into alinement with the bridge, and the recesses 24 and 25 have become alined, by the left-hand wall of the channel 24 bearing against the solid shoulder or face 30 of the keeper 27. The spring keeper thus keeps the bridge and the lens-rim abutments resiliently or yieldingly alined when the mounting is extended for use, as illustrated in Figs. 2 and 8.

In this manner, and by reason of the above-described pivoting arrangement, the left-hand lens of Fig. 8 may be retained in its original position, in the left hand, say, while the right-hand lens has been drawn, by the right hand, downward, as viewed in Fig. 3, in its plane and, at the same time, has been drawn or swung over or around in front of the left-hand lens, to a position separated therefrom, but parallel and substantially alined therewith, as also illustrated in Fig. 3, which suggests the term "Z-fold". From the position shown in Fig. 3, the right-hand lens may now be pushed upward, against the left-hand lens. This is effected without twisting or other distortion of the bridge from its normal set, and no permanent bending or other distortion is introduced to change the normal relation of the various parts. When the two lenses lie thus snugly against each other, with the back or rear of the right-hand lens fitting over or against the front of the left-hand lens, the bridge lies snugly on top of the rims, as illustrated in Fig. 1, extending from abutment 22 to abutment 22 in substantially a horizontal plane across the top of the lenses, and the guards do not interfere with each other, as one is on the right-hand side and the other is on the left. The folded structure is as snug and compact as the two unmounted lenses would fit if laid one on the other, and the folded structure thus occupies a minimum of space. By a reverse movement, the lens members may be moved pivotally from the position of Figs. 1 and 3 into alinement with the bridge, as shown in Figs. 2 and 8.

When folded together, the mounting may be placed in a very small receptacle or case 40, hardly larger than a watch, occupying about half the space of a man's vest pocket.

As further described in the said application, Serial No. 31,187, when the oxford is in the "at-rest" position shown in Figs. 2 and 8, without using tension on the spring bridge 21, and as occurs when the oxford is held in place on the nose, the pivot posts 23 are respectively alined with lines 42 and 43 that intersect below the lenses at a point 44 that is disposed on the central line 45 passing through the center of the bridge and with respect to which the bridge and the lenses are substantially symmetrically disposed. Lines passing through the point 44 and the centers 50 and 52 of the lenses are indicated at 46 and 47. The line 42 is the bisector of the angle between the lines 45 and 46, and the line 43 is the bisector of the angle between the lines 45 and 47.

When the lenses occupy their folded position, therefore, their centers 50 and 52 are exactly alined, one over the other, on the central line 45; and the right-hand side of the right-hand lens will be superposed over the right-hand side of the left-hand lens, and the left-hand side of the right-hand lens over the left-hand side of the left-hand lens.

By removing the pivot post 26, which may be in the form of a dowel, driven in with a friction fit, it is possible easily to replace the keepers 27 when they become old, worn out, broken or otherwise defective, and also to replace the bridges or even the rims with a minimum amount of effort and loss of time to the wearer.

In Figs. 4 to 7, the same post 26 that holds the keeper 27 in place is shown extending through a transversely disposed opening 75 in the pivot post 23 alined with the corresponding openings 72 of the abutment 22. Removal of this pivot post 23 is thus prevented. In order that the post 26 may serve both the function of a pivot for the keeper 27 and the function of holding the pivot 23 in place, the post 23 may be longitudinally slotted, as shown at 76, to receive the keeper.

In the modification of Figs. 9, 10, and 11, the post 26 is replaced by a dowel post 82, mounted in openings 86 similar to the openings 72, and serving as a pivot for the keeper 27, and a separate post 70 is shown to the right of the post 82 for holding the post 23 in position.

To remove the post 23 and, therefore, the bridge, all that is necessary is to remove the post 26 or the post 70, whereupon the post 23 may be taken out of its bore 68. A new bridge or a new rim may then replace the damaged member, and the parts may be secured by a new post 26 or 70. The post 82 may similarly be removed to replace the keeper 28. The post 26 or 70 may be threaded at one end, as shown at 78, Fig. 9, and may be threaded into a correspondingly threaded opening 84 of the side portion 56. To remove the post 26 or 70, its other end may be provided with a kerf 80 for receiving a screw driver. This construction avoids the necessity of driving the posts 26 and 70 home with a drive fit and similarly driving these posts out again.

The sawed slot 25 is preferable to the construction of the slot 25 disclosed in the said application, Serial No. 31,187. When soldering the abutment of the said application to the rim, there was danger of solder getting into the slot, thereby interfering with the proper operation of the spring blade 28 of the keeper 27. According to the present construction, the abutment 22 is made in one solid piece, with the top surface 41 cut by a saw to the required depth. Prior to the saw cut, the top surface is drilled to provide the bore 68 for receiving the pivot member 23. The openings 72 and 86 for the dowels or posts 26, 70, and 82 are then cut through, from side to side of this abutment.

It will be understood that the invention is not restricted to the embodiments illustrated and described herein, and that modifications and changes may be made by persons skilled in the art without departing from the spirit and scope of the invention, as defined in the appended claims.

What is claimed is:

1. An ophthalmic mounting comprising a lens-holding member for holding a lens and having an abutment provided with a bore substantially parallel to the plane of the lens, a pivot member removably mounted in the bore in substantially the said plane, a bridge pivoted to the pivot member to swing in a direction substantially at right angles to the direction of extension of the pivot member, and a post for engaging the pivot member and the abutment positively to lock the pivot member in position on the abutment, the post being removable to permit removing the pivot member and, therefore, the bridge.

2. An ophthalmic mounting comprising two lens members, a bridge, means pivotally connecting the lens members to the ends of the bridge to permit moving the lens members pivotally into alinement with the bridge, means for locking the lens members in alinement with the bridge and for positively preventing further pivotal movement of the lens members after they have been pivotally moved into alinement with the bridge, means whereby the pivotal-connecting means is rendered detachable, and means for positively locking the pivotal connecting means in position.

3. An ophthalmic mounting comprising a lens-holding member having an abutment provided with a longitudinally disposed recess and a transversely disposed bore, a pivot member in the bore, a bridge pivoted to the pivot member and provided with a recess that is adapted to be alined with the abutment recess, a keeper mounted in the abutment recess and adapted to enter the bridge recess when the recesses are alined to prevent pivotal movement of the lens-holding member and the bridge, and means mounted in the abutment extending through the pivot member and the keeper to hold the pivot member in the bore and the keeper in the recess.

4. An ophthalmic mounting comprising a lens-holding member having an abutment provided with a longitudinally disposed recess and a transversely disposed bore, two removable members mounted in the bore and the recess, the member mounted in the bore comprising a pivot member, a bridge pivoted to the pivot member, the member mounted in the recess comprising a keeper for limiting the pivotal movement of the lens-holding member and the bridge, and a post in the abutment for retaining the removable members in position.

5. An ophthalmic mounting comprising two lenses, a bridge, removable means pivotally connecting the upper portions of the lenses to the ends of the bridge to hold the lenses below the bridge and to permit moving the lenses pivotally into alinement with the bridge, removable means for holding the lenses in alinement with the bridge, and common means for holding both said removable means corresponding to each lens in position.

6. An ophthalmic mounting comprising two lenses the upper portion of each of which has a pivot support provided with a recess and a bore, a pivot member removably positioned in each bore in substantially the plane of its lens, a bridge the ends of which are pivotally connected to the respective pivot members to hold the lenses below the bridge and to permit moving the lenses pivotally about the pivot members into alinement with the bridge, means removably disposed in the recesses for engaging the bridge to hold the lenses in alinement with the bridge, and common means for holding each pivot member in its bore and each removably disposed means in its recess.

7. An ophthalmic mounting comprising two lenses the upper portion of each of which has a pivot support provided with a recess, a pivot member removably provided on each support substantially parallel to the plane of its lens, a bridge the ends of which are pivotally connected to the respective pivot members to hold the lenses below the bridge and to permit pivotally folding the lenses sidewise with respect to each other and the bridge about the pivot members into substantial alinement with the bridge, two separate locking members one removably disposed in each recess for yieldingly engaging the respective ends of the bridge to hold the lenses yieldingly in alinement with the bridge, and a post extending through each pivot member to hold the corresponding pivot member in position and upon which the corresponding locking member is mounted in its recess.

8. An ophthalmic mounting comprising two lenses the upper portion of each of which has a pivot support provided with a longitudinally disposed recess and a bore, a pivot member removably positioned in each bore in substantially the plane of its lens, a bridge the ends of which are pivotally connected to the respective pivot members to hold the lenses below the bridge and to permit moving the lenses pivotally about the pivot members into alinement with the bridge, locking members removably disposed in the recesses for engaging the bridge to hold the lenses in alinement with the bridge, and means extending transversely through each support to hold each pivot member in its bore and each locking member in its recess.

9. An ophthalmic mounting comprising two lens-holding members the upper portion of each of which has an abutment provided with a bore, a pivot pin in each bore, each pivot pin having an opening and the abutments having openings alined with the pivot-pin openings, dowels extending in the alined openings of the pivot pins and the abutments, the dowels being removable to permit removal of the pivot pins from their bores, and a bridge the ends of which are pivoted about the pivot pins, the bridge being removable when the pivot pins are removed from their bores.

10. A substantially prismatic abutment having a longitudinal cross section substantially in the form of an inverted scalene triangle, the abutment having a longitudinally disposed recess substantially parallel to the triangular faces of the abutment and a transversely disposed bore both extending into the abutment from the face of the abutment corresponding to the inverted base of the triangle, the bore being disposed intermediately of the recess and being wider than the recess, and the abutment having also an opening extending therethrough between its said triangular faces and through the bore.

11. An ophthalmic mounting comprising two lens-holding members the upper portion of each of which has a substantially prismatic abutment having a longitudinal cross section substantially in the form of an inverted scalene triangle, each abutment having a longitudinally disposed recess substantially parallel to the triangular faces of the abutment and a transversely disposed bore both extending into the abutment from the face of the abutment corresponding to the inverted base of the triangle, each bore being disposed intermediately of the corresponding recess and being wider than the corresponding recess, each abutment being secured to its lens-holding member along a face of the prism corresponding to one of the sides of the triangle, a pivot pin removably positioned in each bore, a bridge the ends of which are pivoted about the pivot pins, and a keeper disposed in each recess, the keepers being adapted to engage the ends of the bridge.

12. An ophthalmic mounting comprising two lenses the upper portion of each of which has a pivot support provided with a recess and a bore, a longitudinally slotted pivot member removably positioned in each bore, a bridge the ends of which are pivotally connected to the respective pivot members to hold the lenses below the bridge and to permit moving the lenses pivotally about the pivot members into alinement with the bridge, means removably disposed in the recesses and the slots of the pivot member for engaging the bridge to hold the lenses in alinement with the bridge, and common means extending through each pivot member and the corresponding removably disposed means for holding each pivot member in its bore and each removably disposed means in its recess and the corresponding slot.

13. An ophthalmic mounting comprising two lenses the upper portion of each of which is provided with an abutment, a bridge connecting the abutments to hold the lenses below the bridge, each abutment having a substantially flat surface and provided with a pivot extending in an up-and-down direction substantially at right angles to the corresponding flat surfaces of the abutments, the bridge being constituted of continuous, stiff, spring metal slightly convexed at its center but having flat unbent ends disposed in face-to-face contact with the said substantially flat surfaces of the abutments, the ends of the bridge being pivotally connected to the respective pivots to render the lenses pivotally movable sidewise with respect to each other about the respective pivots into and out of substantial alinement with the bridge, the abutments extending toward each other when the lenses are in the said substantial alinement with the bridge, means for preventing the flat ends of the bridge from moving out of contact with the respective flat surfaces of the abutments, means for rendering the pivots detachable, and means for positively locking the pivots in position on the respective abutments.

14. An ophthalmic mounting having lens-holding means for use with lenses comprising two lens-holding members each having an abutment adapted to be positioned adjacent the upper portion of the corresponding lens, a bridge connecting the abutments to hold the major portions of the lenses below the bridge, each abutment being provided with a pivot member extending in an up-and-down direction substantially parallel to the plane of the lenses when the lenses are in the lens-holding members, the ends of the bridge being pivotally connected to the respective pivot members to render the lenses pivotally movable sidewise with respect to each other about the respective pivot members into and out of substantial alinement with the bridge, means for rendering the pivot members detachable, and means for positively locking the pivot members in position on the respective abutments.

15. An ophthalmic mounting comprising a lens-holding member having an abutment comprising a body portion and two side portions extending from the body portion at one end thereof and separated by a recess, a bridge pivoted to the abutment and provided with a recess that is adapted to be alined with the abutment recess, a keeper mounted in the abutment recess and adapted to enter the bridge recess when the recesses are alined to prevent pivotal movement of the lens-holding member and the bridge, means tending to maintain the keeper in the bridge recess when the recesses are alined, and a post mounted in the side portions about which the keeper is pivoted.

16. An ophthalmic mounting comprising a lens-holding member having an abutment comprising a body portion and two side portions extending from the body portion at one end thereof and separated by a recess, a bridge pivoted to the abutment and provided with a recess that is adapted to be alined with the abutment recess, a keeper mounted in the abutment recess and adapted to enter the bridge recess when the recesses are alined to prevent pivotal movement of the lens-holding member and the bridge, means tending to maintain the keeper in the bridge recess when the recesses are alined, and a post mounted in the side portions about which the keeper is pivoted, the post being removable to permit replacing the keeper.

17. An ophthalmic mounting comprising a lens-holding member having an abutment having a recess, a bridge pivoted to the abutment and provided with a recess that is adapted to be alined with the abutment recess, a keeper mounted in the abutment recess and adapted to enter the bridge recess when the recesses are alined to control pivotal movement of the lens-holding member and the bridge, means tending to maintain the keeper in the bridge recess when the recesses are alined, and a post about which the keeper is pivoted.

18. An ophthalmic mounting comprising a lens-holding member having an abutment having a recess, a bridge pivoted to the abutment and provided with a recess that is adapted to be alined with the abutment recess, a keeper mounted in the abutment recess and adapted to enter the bridge recess when the recesses are alined to control pivotal movement of the lens-holding member and the bridge, means tending to maintain the keeper in the bridge recess when the recesses are alined, and a post about which the keeper is pivoted, the post being removable to permit replacing the keeper.

RAYMOND L. WELLS.